US012578075B1

(12) United States Patent
Kamath et al.

(10) Patent No.: US 12,578,075 B1
(45) Date of Patent: Mar. 17, 2026

(54) ONE PIECE LENS AND REFLECTOR FOR RECESSED LIGHTING

(71) Applicant: SIGNIFY HOLDING B.V., Eindhoven (NL)

(72) Inventors: Ramanand Radhakrishna Kamath, Peachtree City, GA (US); Wei Zhao, Shanghai (CN); Zhihong Lin, Shanghai (CN); Wilston Nigel Christopher Sayers, Peachtree City, GA (US); Kyle Lowery, Peachtree City, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/084,838

(22) Filed: Mar. 20, 2025

(51) Int. Cl.

| | |
|---|---|
| ***F21V 7/04*** | (2006.01) |
| ***F21S 8/02*** | (2006.01) |
| ***F21V 5/04*** | (2006.01) |
| ***F21V 17/10*** | (2006.01) |
| *F21Y 115/10* | (2016.01) |

(52) U.S. Cl.
CPC ................ *F21V 7/04* (2013.01); *F21S 8/026* (2013.01); *F21V 5/04* (2013.01); *F21V 17/101* (2013.01); *F21Y 2115/10* (2016.08)

(58) Field of Classification Search
CPC .. F21V 7/04; F21V 5/04; F21V 17/101; F21S 8/026
See application file for complete search history.

(56) References Cited

U.S. PATENT DOCUMENTS

| | | | | |
|---|---|---|---|---|
| 8,979,329 | B1 * | 3/2015 | Moore | F21V 7/09 362/346 |
| 9,702,533 | B1 * | 7/2017 | Harpenau | F21V 21/03 |
| 9,892,693 | B1 | 2/2018 | Kumar et al. | |
| 10,451,252 | B1 * | 10/2019 | Sayers | F21V 17/101 |
| 11,339,949 | B1 * | 5/2022 | Rabin | F21V 17/16 |
| 2011/0267828 | A1 | 11/2011 | Bazydola et al. | |
| 2012/0218764 | A1 * | 8/2012 | Williamson | F21K 9/00 362/294 |
| 2020/0080706 | A1 * | 3/2020 | Nobis | F21S 8/026 |
| 2023/0400163 | A1 | 12/2023 | Kumar et al. | |

* cited by examiner

*Primary Examiner* — James R Greece
*Assistant Examiner* — Michael Chiang

(57) ABSTRACT

A recessed lighting luminaire component that includes a reflector integrated with a lens is described herein. The reflector may have a square or round top opening, the walls of the reflector widening as the walls extend downward to a flange, the walls continuing below the flange in a square or round box. A square or round lens is integrated with the square or round box of the reflector, the square or round lens includes a lens box with an open top and a bottom of the lens box being a semi-transparent convex material, where walls of the lens box and the walls of the reflector are joined, perhaps with an ultrasonic weld, the flange being of circular shape extending outward from the reflector, the flange including a plurality of tabs, the flange configured to mount inside of a recessed lighting luminaire housing.

20 Claims, 11 Drawing Sheets

ONE PIECE LENS AND REFLECTOR FOR RECESSED LIGHTING

FIELD OF THE INVENTIONS

This document relates to luminaires, and more specifically, to the field of the design of recessed lighting fixtures.

BACKGROUND

Recessed lighting fixtures are built into the ceiling of a building and often are limited in the space provided for the design of the luminaire. As a result, there is a need for minimizing space while maximizing the functionality of the recessed lighting unit design.

BRIEF SUMMARY

A solution that reduces space and optimizes optical performance for a recessed light is described herein.

In one aspect, a recessed lighting luminaire component includes an upper reflector 118 with a top opening having a substantially rectangular shape, where corners of the square top opening are rounded such that the corners comprise a disconnected circle, walls of the upper reflector 118 widening as the walls extend downward to a flange 310, the walls continuing below the flange 310 in a substantially rectangular box without rounded corners, and a lens 120 with a substantially rectangular shape integrated with the substantially rectangular box of the upper reflector 118, the lens 120 includes a lens box with an open top and a bottom of the lens box being a semi-transparent convex material, where walls of the lens box and the walls of the upper reflector 118 are joined; the flange 310 being of circular shape extending outward from the upper reflector 118, the flange 310 including a plurality of tabs 402, 404, 502, the flange 310 configured to mount inside of a recessed lighting luminaire housing.

The recessed lighting luminaire component may also include where the lens 120 is joined with the upper reflector 118 with an ultrasonic weld 302. The walls of the upper reflector 118 may be opaque polycarbonate. The walls of the upper reflector 118 may be a semi-specular finish. The walls of the upper reflector 118 may be a highly-specular finish. The walls of the lens 120 box may be opaque white material. The semi-transparent convex material may be polycarbonate. The recessed lighting luminaire component may also include where a top opening of the upper reflector 118 is configured to interface with a luminaire. The walls of the lens 120 box may be opaque polycarbonate. The recessed lighting luminaire component may also include where the luminaire is an LED module 102.

In one aspect, a recessed lighting luminaire component includes an upper reflector (118) with a top opening having a substantially circular shape, walls of the upper reflector (118) widening as the walls extend downward to a flange (310), the walls continuing below the flange (310) in a substantially circular box, and a lens (120) with a substantially circular shape integrated with the substantially circular box of the upper reflector (118), the lens (120) includes a lens box with an open top and a bottom of the lens box being a semi-transparent convex material, where walls of the lens box and the walls of the upper reflector (118) are joined; the flange (310) being of circular shape extending outward from the upper reflector (118), the flange (310) including a plurality of tabs (402) (404) (502), the flange (310) configured to mount inside of a recessed lighting luminaire housing.

The recessed lighting luminaire component may also include where the lens (120) is joined with the upper reflector (118) with an ultrasonic weld (302). The recessed lighting luminaire component may also include where the walls of the upper reflector (118) are opaque polycarbonate. The recessed lighting luminaire component may also include where the walls of the upper reflector (118) are a semi-specular finish. The recessed lighting luminaire component may also include where the walls of the upper reflector (118) are a highly-specular finish. The recessed lighting luminaire component may also include where the walls of the lens box are opaque white material. The recessed lighting luminaire component may also include where the semi-transparent convex material is polycarbonate. The recessed lighting luminaire component may also include where the top opening of the upper reflector (118) is configured to interface with a luminaire. The recessed lighting luminaire component may also include where the walls of the lens box are opaque polycarbonate. The recessed lighting luminaire component may also include where the luminaire is an LED module (102). Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following paragraphs, particular embodiments will be described in further detail by way of example with reference to the figures. In the description, well known components, methods, and/or processing techniques are omitted or briefly described. Dimensions used herein are used as an example, and could vary without deviating from the inventions described here. Furthermore, reference to various feature(s) of the embodiments is not to suggest that all embodiments must include the referenced feature(s).

Figure 1:
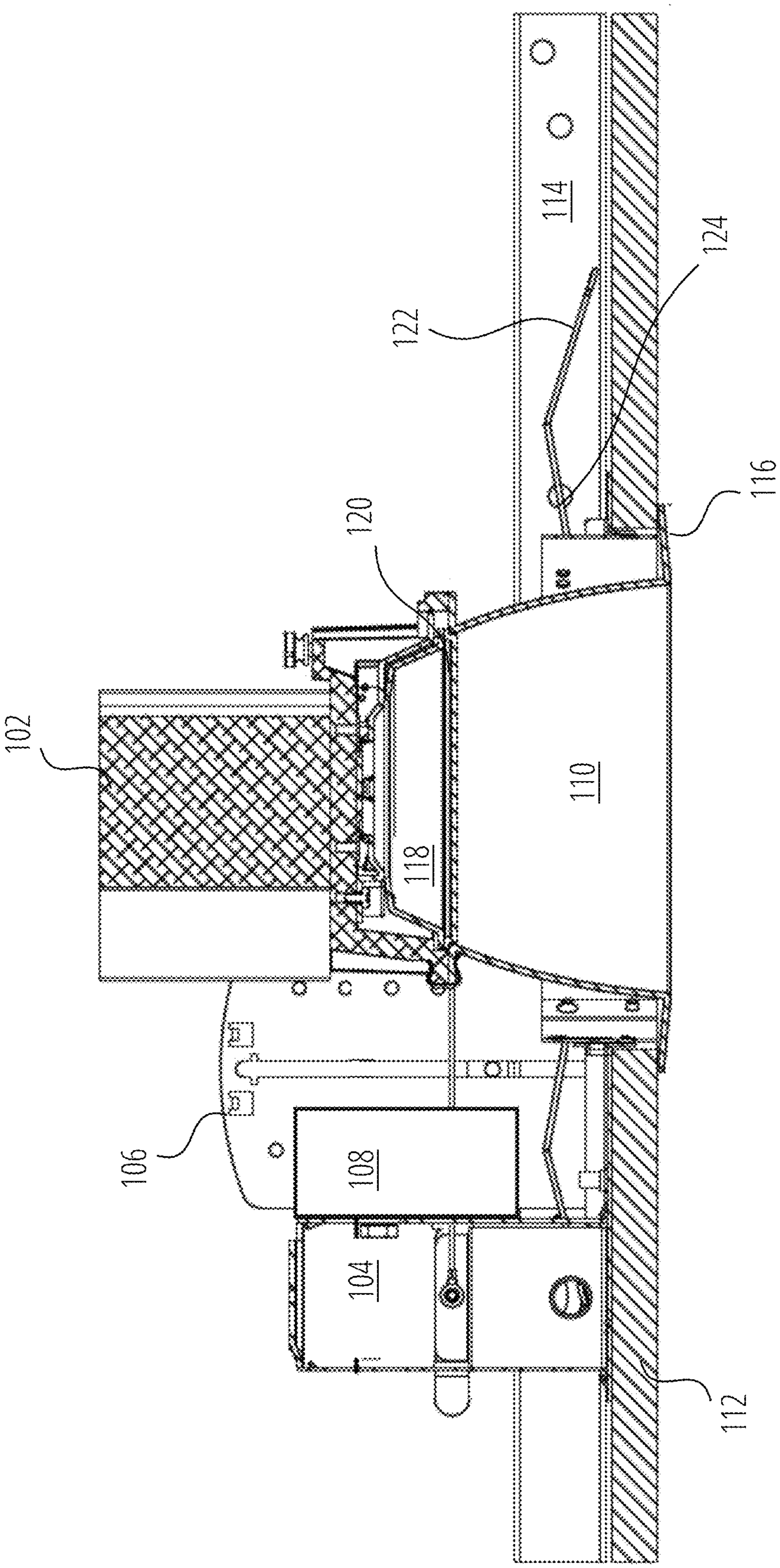
FIG. 1 shows a cross section of a recessed lighting unit mounted in a ceiling.

FIG. 1 shows a luminaire for mounting above a ceiling 112 as a recessed lighting unit. The LED module 102 may be mounted on the top of a reflector 110 and may provide the light for the room below the ceiling 112. The light from the LED module 102 may beam down through the upper reflector 118 and lens 120 into the reflector 110 where it could be directed into the room through the trim flange 116. The trim flange 116 could help support luminaire and direct the unit to a specific position. The trim flange 116 helps to prevent light from going into the ceiling 112. An electrical box 104 may connect to the building power and provide power to the control module 108 and to the LED module 102. In some embodiments, the electrical box 104 is 87 mm high. In some embodiments, the ceiling 112 is 13 mm in width. The LED module 102 could be 76 mm high and have a diameter of 82 mm.

The reflector 110 may be 114 mm at the bottom, 84 mm at the top, and 63 mm high. The reflector 110 may be a cone shape. In some embodiments, the reflector 110 is made of aluminum. In some embodiments, the reflector 110 may be made of four aluminum reflector panels. In some embodiments, the aluminum for the reflector 110 may be polished to present a reflective surface. In some embodiments, the aluminum for the reflector 110 may be painted. In some embodiments, the reflector 110 may be made of a non conductive material like plastic.

The luminaire assembly may be mounted on a mounting frame 114 that rests on the ceiling 112 and optionally may be connected to the building structure with hanger bar brackets 106. Mouse-trap supports 122 may be connected to the reflector 110 with mouse-trap springs 124 to hold the assembly tight to the ceiling 112. The mounting frame 114 is optional. In some embodiments, the luminaire may be directly installed into the cutout on the ceiling 112. Torsions spring supports 122 may be connected to the reflector 110 with torsion springs 124 to hold the assembly tight to the ceiling 112.

Figure 2:
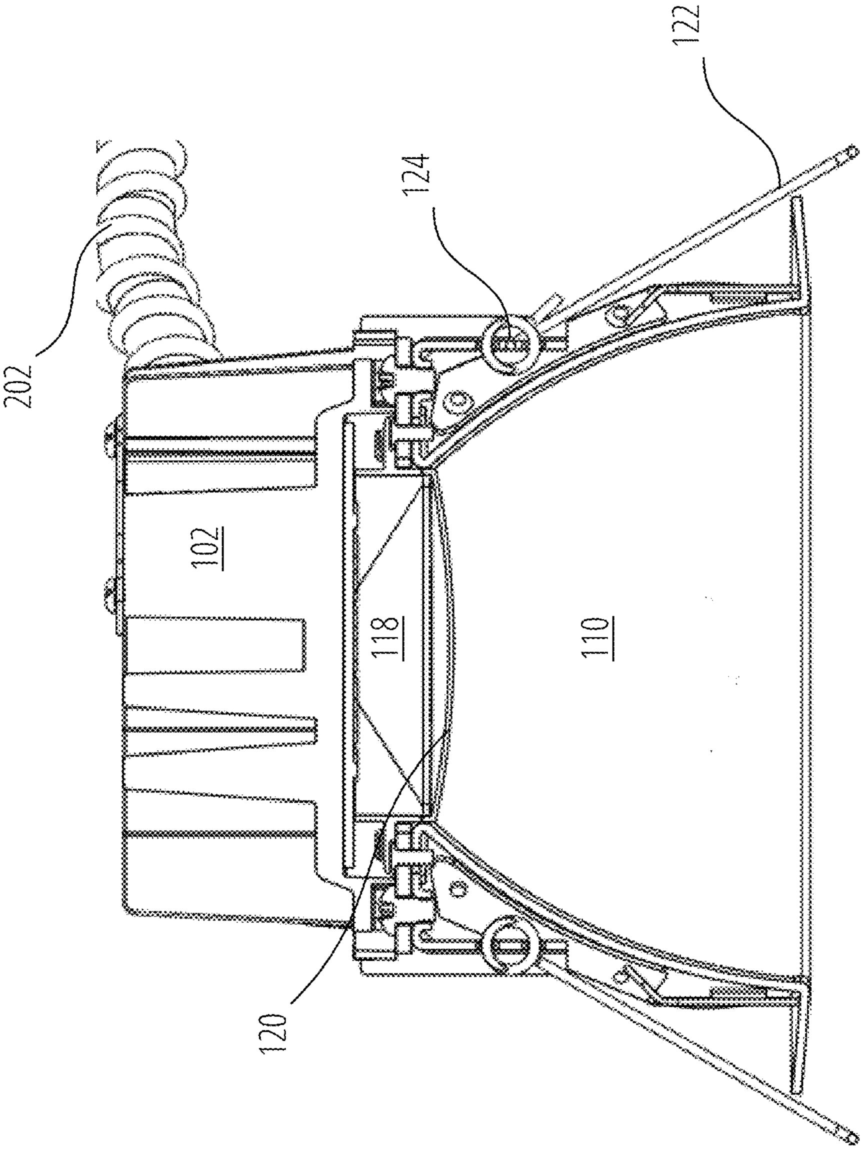
FIG. 2 illustrates recessed lighting unit can.

FIG. 2 is a focused view of the luminaire assembly. Power wires 202 could deliver power to the LED module 102. The LED module 102 focuses light into the upper reflector 118, through the lens 120, and into the reflector 110. The upper reflector 118 and the lens 120 are a single lens/reflector assembly 406.

Figure 3:
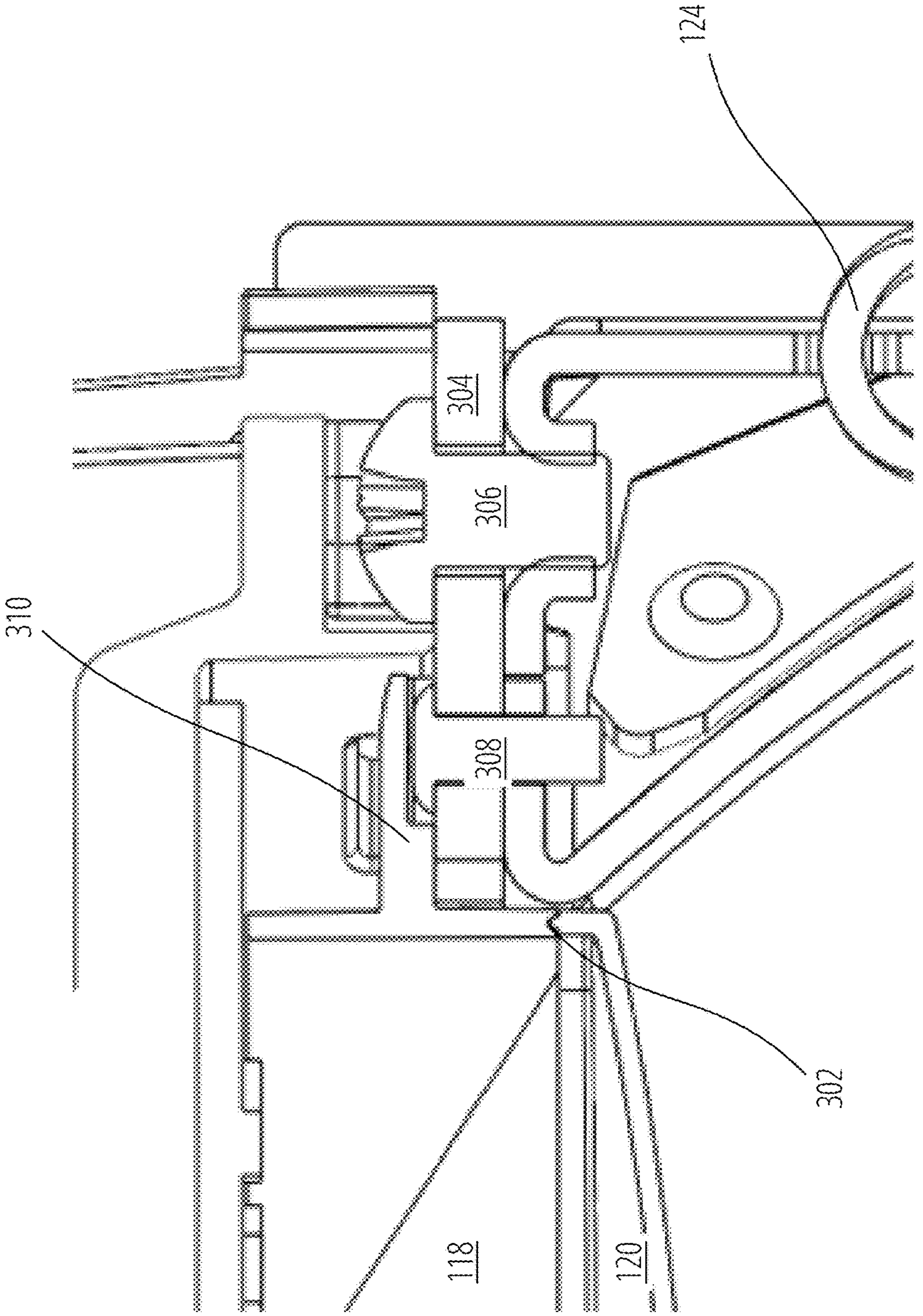
FIG. 3 shows the detailed corner interface of an upper reflector and a lens in a recessed lighting unit.

FIG. 3 shows the ultrasonic weld 302 that adheres the lens 120 to the upper reflector 118 as a single piece. By combining the lens 120 and upper reflector 118, the wall thickness of the upper reflector 118 and lens 120 can be reduced, leaving more room for lighting and blocking light leakage at the junction between the lens 120 and the upper reflector 118.

In this view, the flange 310 is shown sitting on top of the collar 304. The tabs 402, 404, 502 could be used to snap the combined lens 120 and upper reflector 118 assembly into the collar 304 to hold the lens/reflector assembly 406 in place. The collar 304 may be held to the reflector 110 with rivets 308 and screws 306.

Figure 4:
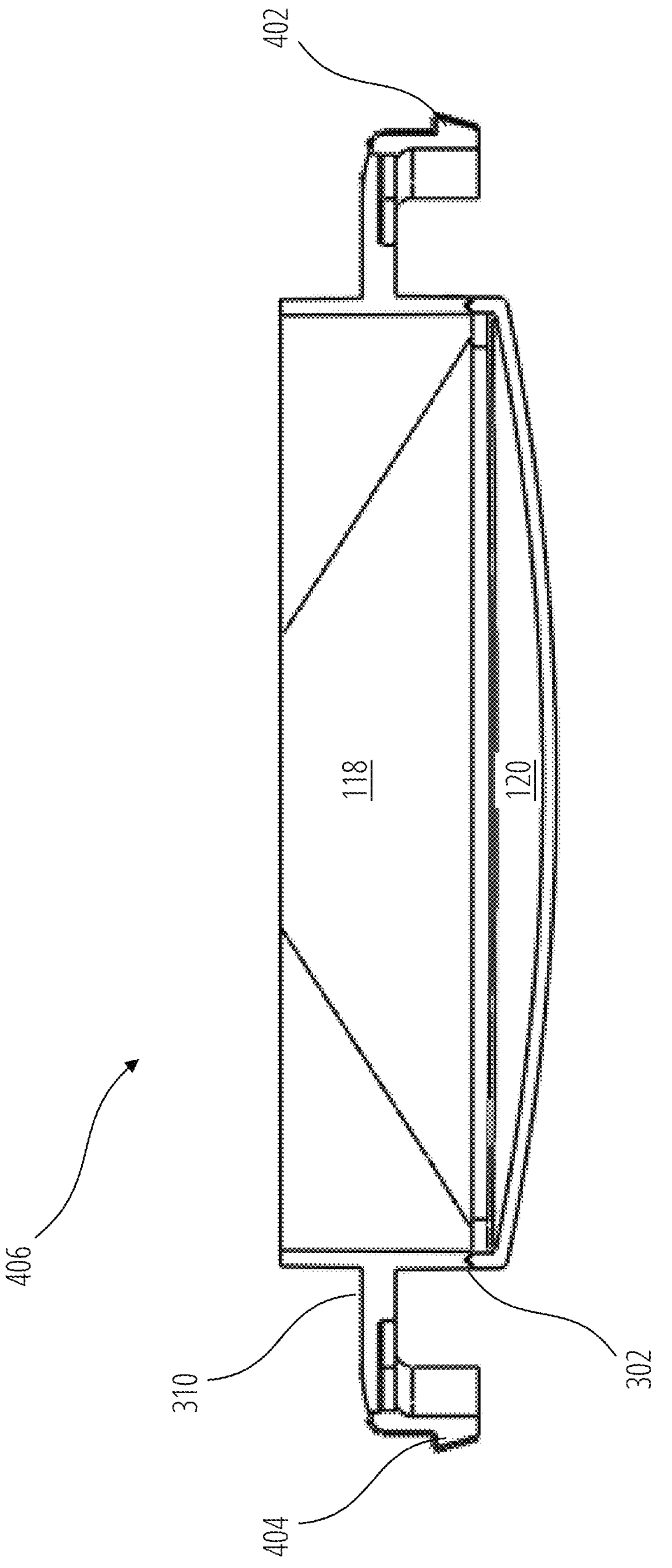
FIG. 4 illustrates a front view of an integrated upper reflector and lens for a recessed lighting unit.

The lens/reflector assembly 406, a recessed lighting luminaire component, is shown in FIG. 4. The lens/reflector assembly 406 combines the upper reflector 118 with the lens 120 using an ultrasonic weld 302. The flange 310 encircles the lens/reflector assembly 406, and may have three tabs 402, 404, 502. The tabs 402, 404, 502 are used to hold the lens/reflector assembly 406 in the collar 304. The lens/reflector assembly 406 could be 10 mm high and 66 mm square. The top opening of the lens/reflector assembly 406 could have rounded corners with a 33 mm radius. Alternately, the top opening of the lens/reflector assembly 406 could be round.

Figure 5:
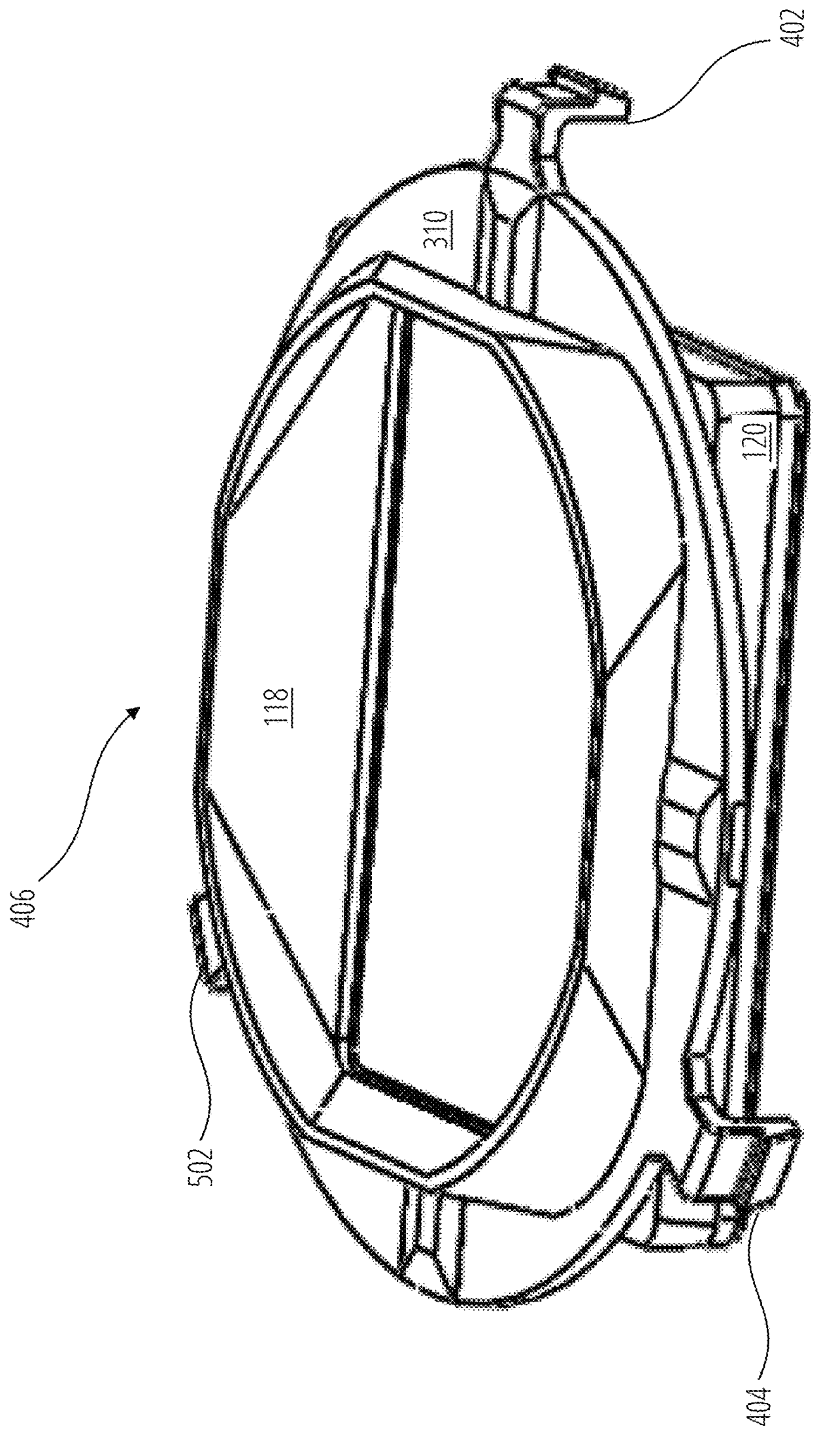
FIG. 5 shows an upper, front perspective view of an integrated upper reflector and lens for a recessed lighting unit.

FIG. 5 is a perspective view of the lens/reflector assembly 406. The LED module 102 mounts on top of the upper reflector 118, on top of the square walls with the corners of the square top opening rounded such that the corners comprise a disconnected circle or have a substantially circular shape with four flat sides. In some embodiments, the walls are rectangular or triangular or circular rather than square. These walls continue down to the flange 310. Below the flange, the walls of the upper reflector 118 are essentially square with slightly rounded corners. In another embodiment, the walls of the upper reflector 118 could be round. The upper reflector 118 may be polycarbonate. The inside of the walls of the upper reflector 118 may be opaque. The inside of the walls of the upper reflector 118 may be opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)) that can be ultrasonically welded. The inside of the walls of the upper reflector 118 may have a semi-specular finish. The inside of the walls of the upper reflector 118 may have a highly-specular finish. Specular reflection is the mirror-like reflection of waves, such as light, from a surface. The law of reflection states that a reflected ray of light emerges from the reflecting surface at the same angle to the surface normal as the incident ray, but on the opposing side of the surface normal in the plane formed by the incident and reflected rays. So the semi-specular finish would produce a more diffuse, less clear and a less glaring reflection of the light, where a highly-specular finish would produce a mirror like reflection of the light.

The inside of the walls of the upper reflector 118 may be painted. The top and the bottom of the upper reflector 118 may be open. The upper reflector 118 could have walls 7-8 mm high and a 66 mm wide (or in diameter for round embodiments).

The flange 310 may be circular, surrounding the upper reflector 118. The flange 310 may have three tabs 402, 404, 502. The flange 310 may be made of polycarbonate (or any alternate material that can be ultrasonically welded) and may be molded such that the flange 310 is integral to the upper reflector 118 and the tabs 402, 404, 502. The flange 310 could have a 45 mm radius.

The lens 120 may have a square or round box structure with walls 2-3 mm high and 66 mm wide. The lens 120 could have a 2-3 mm deep convex curve on the bottom side, covered with an opaque white material such as polycarbonate. In other embodiments, the lens 120 is clear. The walls of the lens 120 could be transparent or semi-transparent, highly- or semi-specular finishes or painted finishes, perhaps of a polycarbonate material.

Figure 6:
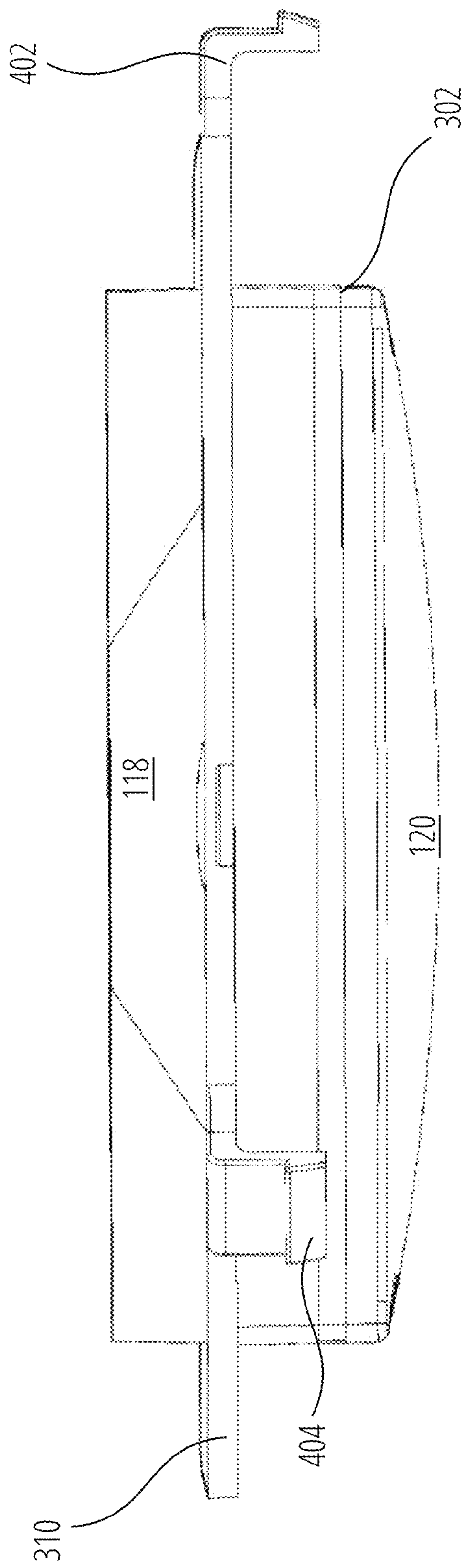
FIG. 6 illustrates a front view of an integrated upper reflector and lens for a recessed lighting unit.
Figure 7:
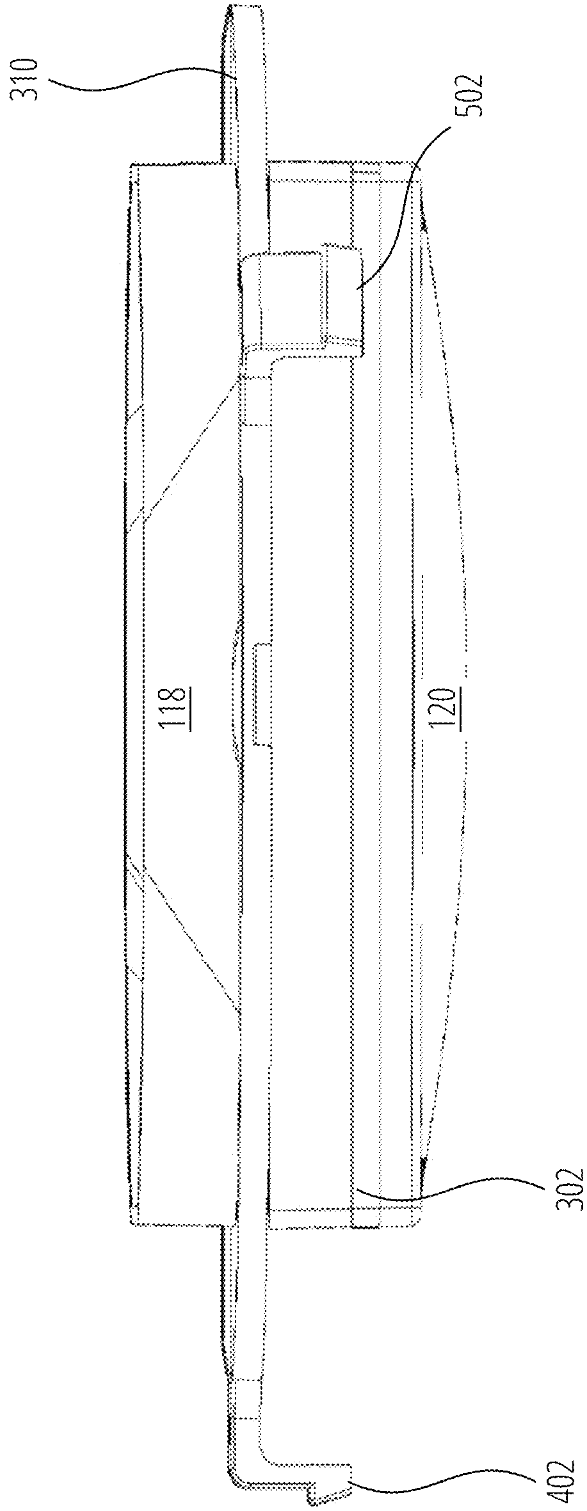
FIG. 7 illustrates a back view of an integrated upper reflector and lens for a recessed lighting unit.
Figure 8:
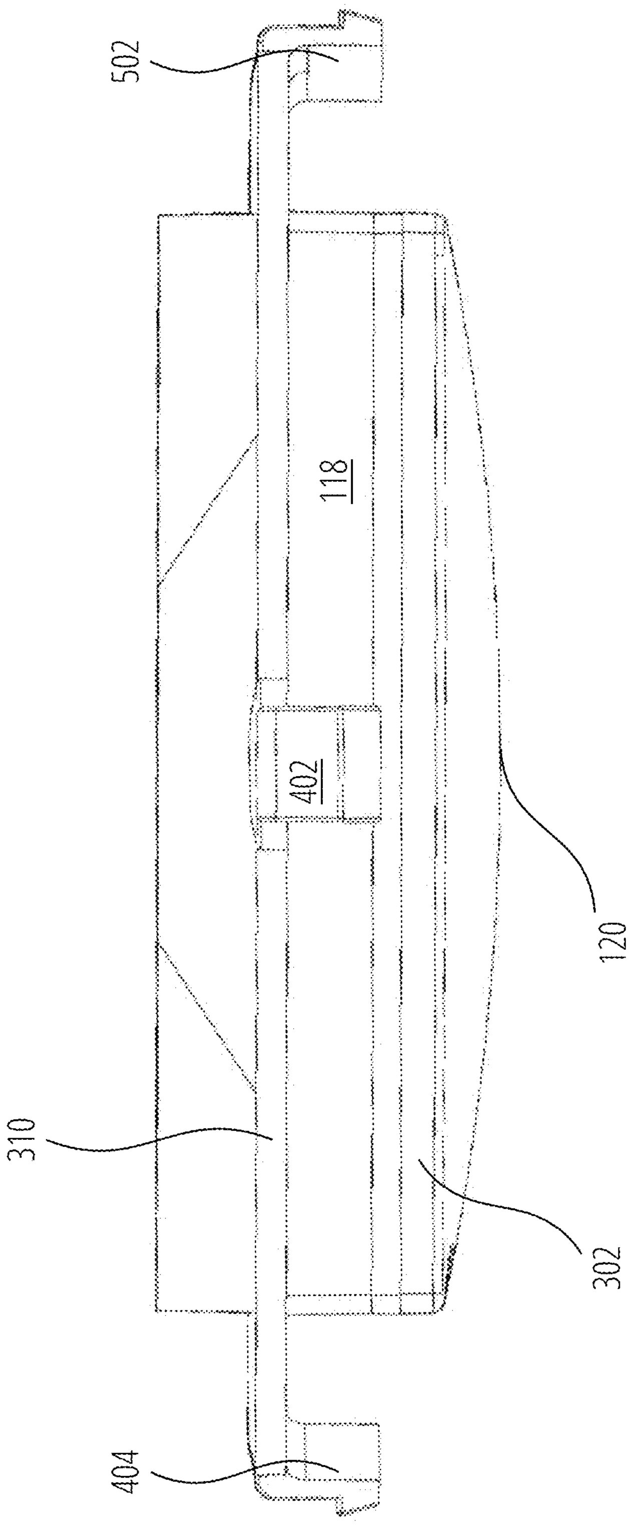
FIG. 8 illustrates a right view of an integrated upper reflector and lens for a recessed lighting unit.
Figure 9:
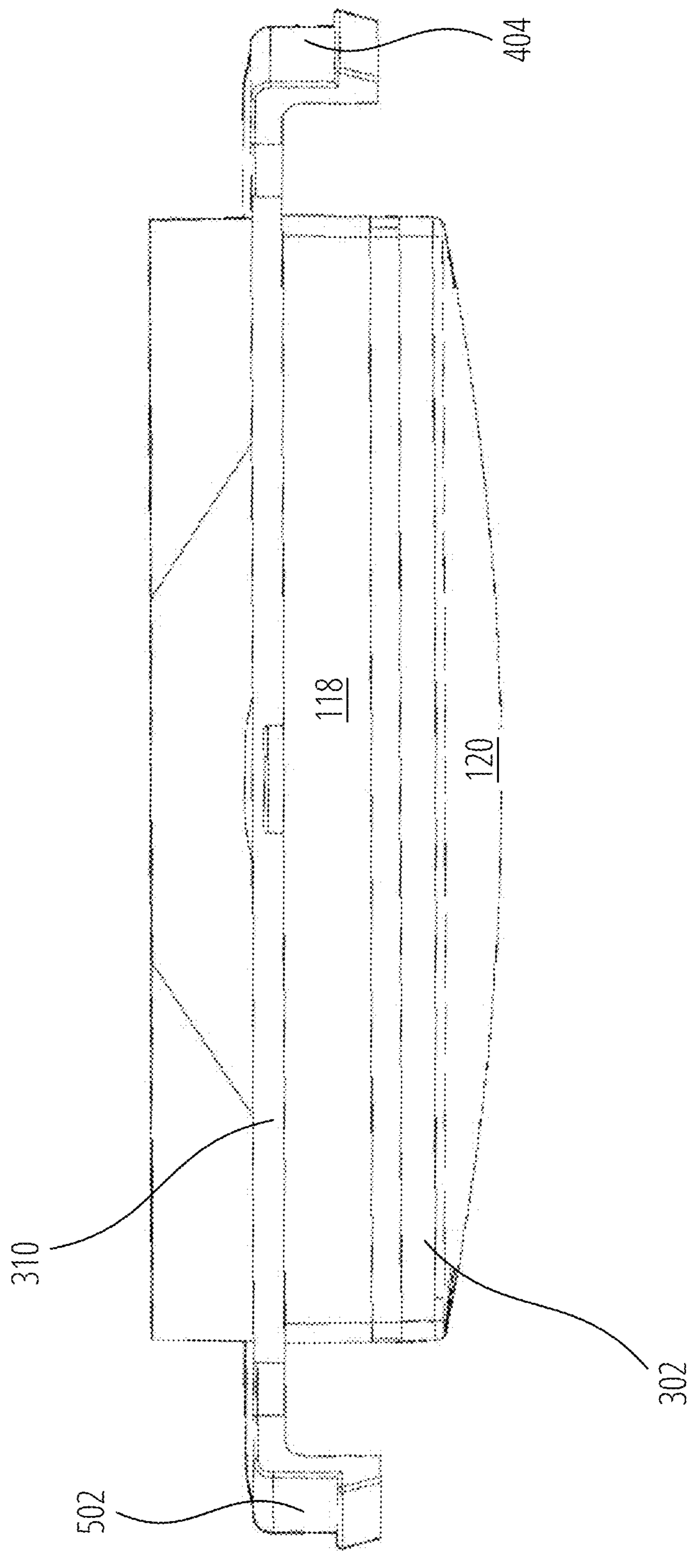
FIG. 9 illustrates a left view of an integrated upper reflector and lens for a recessed lighting unit.

FIG. 6 shows the lens/reflector assembly 406 from the front view. The convex curve of the lens 120 can be seen below the lens/reflector assembly 406 and the upper reflector 118 is visible on the top. The flange 310 can be seen encircling the lens/reflector assembly 406 slightly above the midpoint, with two tabs 402, 404. The ultrasonic weld 302 can be seen connecting the lens 120 to the upper reflector 118. FIG. 7 shows the back side, FIG. 8 shows the right side, and FIG. 9 shows the left side of the lens/reflector assembly 406.

Figure 10:
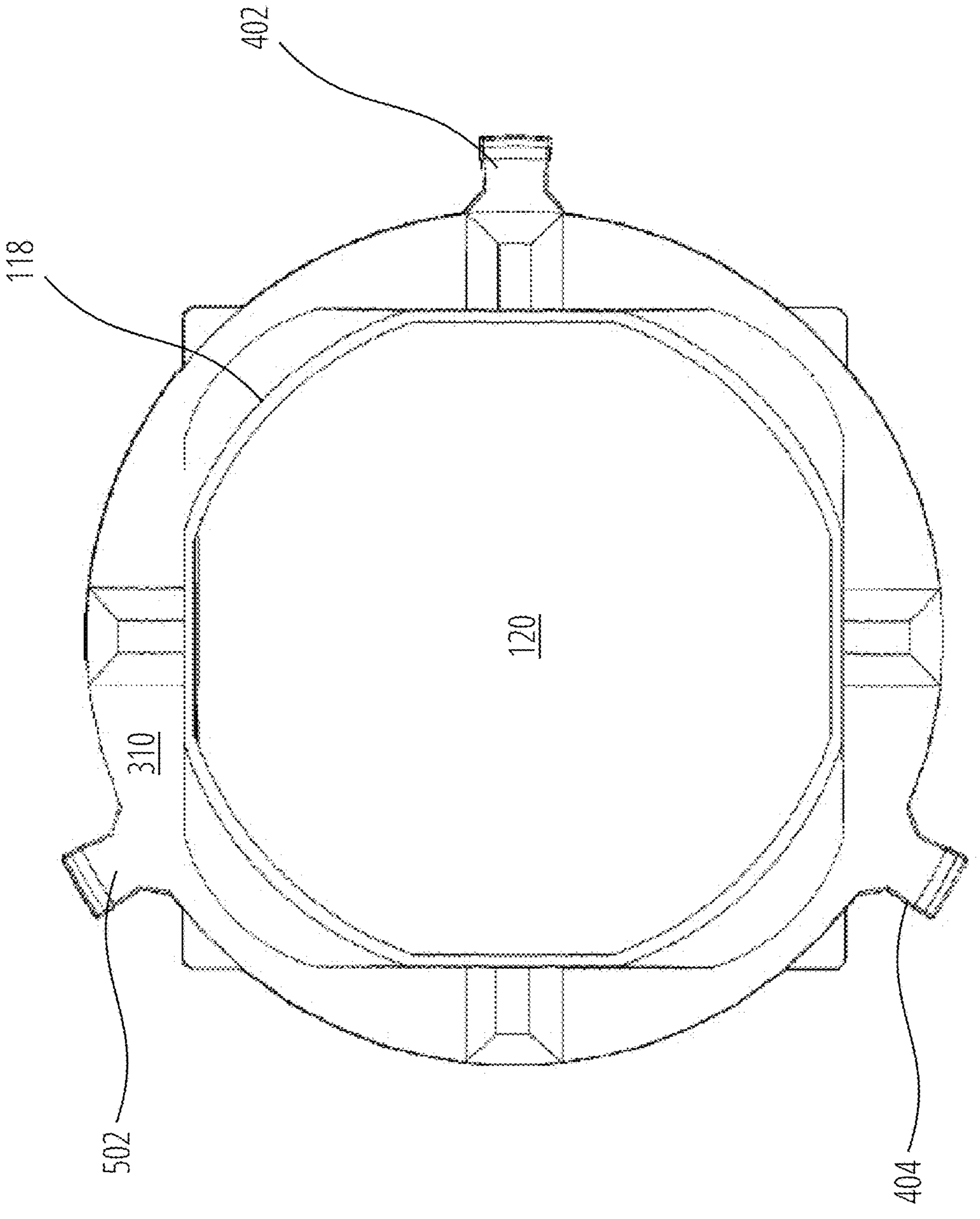
FIG. 10 illustrates a top view of an integrated upper reflector and lens for a recessed lighting unit.

FIG. 10 is a top view of the lens/reflector assembly 406. The lens 120 can be seen in the center, looking through the upper reflector 118. The circular flange 310 is visible, with its three tabs 402, 404, 502. The upper reflector 118 with its disconnected circle or substantially circular shape with four flat sides is seen, as ready to accept an LED module 102.

Figure 11:
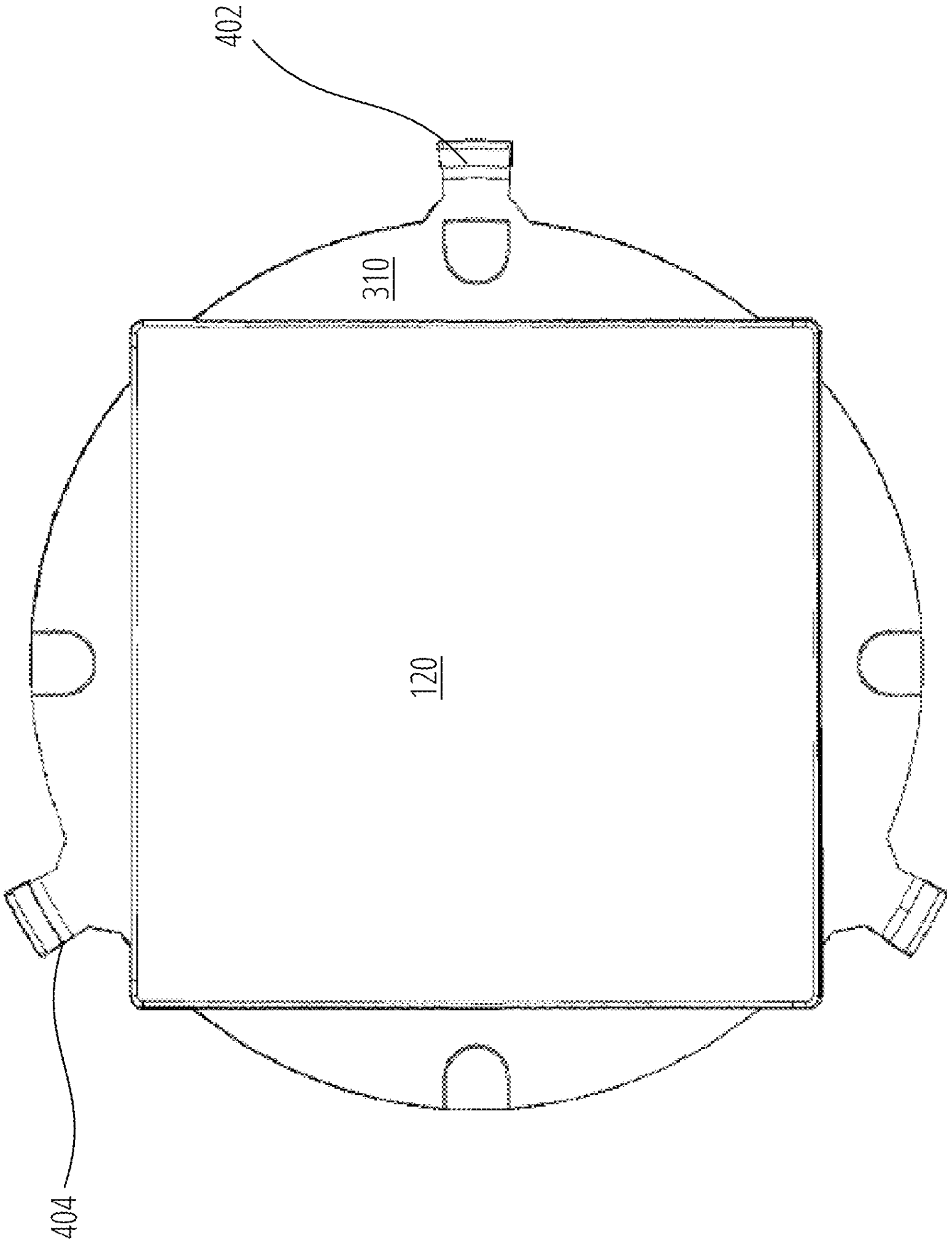
FIG. 11 illustrates a bottom view of an integrated upper reflector and lens for a recessed lighting unit.

FIG. 11 shows the bottom view of the lens/reflector assembly 406. The square lens 120 is seen in the center of the lens/reflector assembly 406. The round flange 310 with its three tabs 402, 404, 502 is visible. The upper reflector 118 is not visible in the bottom view.

While the disclosure has been illustrated and described in detail in the drawings and foregoing description, such illustration and description are to be considered illustrative or exemplary and not restrictive. The claimed inventions are not limited to the disclosed embodiments.

The term "substantially equal" may be used to refer to values that are within ±20% of one another in some embodiments, within ±10% of one another in some embodiments, within ±5% of one another in some embodiments, and yet within ±2% of one another in some embodiments.

Other variations to the disclosed embodiments can be understood and effected by those skilled in the art of practicing the claimed inventions, from a study of the drawings, the disclosure, and the appended claims.

In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to obtain an advantage.

Any reference signs in the claims should not be construed as limiting the scope.

LISTING OF DRAWING ELEMENTS

102 LED module
104 electrical box
106 hanger bar bracket
108 control module
110 reflector
112 ceiling
114 mounting frame
116 trim flange
118 upper reflector
120 lens
122 mouse-trap support
124 mouse-trap spring
202 power wire
302 ultrasonic weld
304 collar
306 screw
308 rivet
310 flange
402 tab
404 tab
406 lens/reflector assembly
502 tab

The invention claimed is:

1. A recessed lighting luminaire component comprising:

an upper reflector with a top opening having a substantially rectangular shape, where corners of the top opening are rounded such that the corners comprise a disconnected circle, walls of the upper reflector widening as the walls extend downward to a flange, the walls continuing below the flange in a substantially rectangular box without rounded corners; and a lens with a substantially rectangular shape integrated with the substantially rectangular box of the upper reflector, the lens comprising a lens box with an open top and a bottom of the lens box being a semi-transparent convex material, where walls of the lens box and the walls of the upper reflector are joined;

the flange being of circular shape extending outward from the upper reflector, the flange including a plurality of tabs, the flange configured to mount inside of a recessed lighting luminaire housing.

2. The recessed lighting luminaire component of claim 1 where the lens is joined with the upper reflector with an ultrasonic weld.

3. The recessed lighting luminaire component of claim 1 where the walls of the upper reflector are opaque polycarbonate.

4. The recessed lighting luminaire component of claim 1 where the walls of the upper reflector are a semi-specular finish.

5. The recessed lighting luminaire component of claim 1 where the walls of the upper reflector are a highly-specular finish.

6. The recessed lighting luminaire component of claim 1 where the walls of the lens box are opaque white material.

7. The recessed lighting luminaire component of claim 6 where the walls of the lens box are opaque polycarbonate.

8. The recessed lighting luminaire component of claim 1 where the semi-transparent convex material is polycarbonate.

9. The recessed lighting luminaire component of claim 1 where the top opening of the upper reflector is configured to interface with a luminaire.

10. The recessed lighting luminaire component of claim 9 where the luminaire is an LED module.

11. A recessed lighting luminaire component comprising:

an upper reflector with a top opening having a substantially circular shape, walls of the upper reflector widening as the walls extend downward to a flange, the walls continuing below the flange in a substantially circular box; and a lens with a substantially circular shape integrated with the substantially circular box of the upper reflector, the lens comprising a lens box with an open top and a bottom of the lens box being a semi-transparent convex material, where walls of the lens box and the walls of the upper reflector are joined;

the flange being of circular shape extending outward from the upper reflector, the flange including a plurality of tabs, the flange configured to mount inside of a recessed lighting luminaire housing.

12. The recessed lighting luminaire component of claim 11 where the lens is joined with the upper reflector with an ultrasonic weld.

13. The recessed lighting luminaire component of claim 11 where the walls of the upper reflector are opaque polycarbonate.

14. The recessed lighting luminaire component of claim 11 where the walls of the upper reflector are a semi-specular finish.

15. The recessed lighting luminaire component of claim 11 where the walls of the upper reflector are a highly-specular finish.

16. The recessed lighting luminaire component of claim 11 where the walls of the lens box are opaque white material.

17. The recessed lighting luminaire component of claim 16 where the walls of the lens box are opaque polycarbonate.

18. The recessed lighting luminaire component of claim 11 where the semi-transparent convex material is polycarbonate.

19. The recessed lighting luminaire component of claim 11 where the top opening of the upper reflector is configured to interface with a luminaire.

20. The recessed lighting luminaire component of claim 19 where the luminaire is an LED module.

* * * * *